(12) United States Patent
Oh

(10) Patent No.: US 8,703,357 B2
(45) Date of Patent: Apr. 22, 2014

(54) FUEL CELL STACK

(75) Inventor: Min-Jung Oh, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1491 days.

(21) Appl. No.: 11/974,311

(22) Filed: Oct. 12, 2007

(65) Prior Publication Data

US 2008/0113229 A1 May 15, 2008

(30) Foreign Application Priority Data

Nov. 15, 2006 (KR) .......... 10-2006-0112925

(51) Int. Cl.
  H01M 8/04 (2006.01)
  H01M 8/24 (2006.01)
  H01M 10/50 (2006.01)
(52) U.S. Cl.
  USPC .......... 429/512; 429/452; 429/120

(58) Field of Classification Search
  USPC .......... 429/459, 436, 512, 452, 120
  See application file for complete search history.

(56) References Cited

U.S. PATENT DOCUMENTS

| 4,945,010 A | * | 7/1990 | Kaufman et al. | 429/435 |
| 7,879,507 B2 | * | 2/2011 | Osenar et al. | 429/513 |

FOREIGN PATENT DOCUMENTS

| JP | 2005-078970 | 3/2005 |
| KR | 10 2005 0122769 | 12/2005 |

* cited by examiner

*Primary Examiner* — Helen O Conley
(74) *Attorney, Agent, or Firm* — Knobbe, Martens, Olson & Bear, LLP

(57) ABSTRACT

A fuel cell stack is disclosed. In one embodiment, the fuel cell stack includes a main body that is constructed with an assembly of a plurality of generators, and at least one heat pipe that is disposed in the main body to provide heat to the generators corresponding to heat-generating temperature differences according to positions of the generators.

20 Claims, 8 Drawing Sheets

FUEL CELL STACK

CROSS-REFERENCE TO RELATED APPLICATION

This application claims priority to and the benefit of Korean Patent Application No. 10-2006-0112925 filed in the Korean Intellectual Property Office on Nov. 15, 2006, the entire contents of which are incorporated herein by reference.

BACKGROUND OF THE INVENTION

1. Field of the Invention

The present invention relates to a fuel cell stack, and more particularly, to a heat transfer structure for the fuel cell stack.

2. Description of the Related Technology

As is well known in the related art, a fuel cell is an energy generating system for directly transforming chemical reaction energy of a fuel and a separate oxidizing agent into electrical energy. The fuel cell may be classified variously according to types of system components and fuels.

The fuel cell includes a stack formed by successively stacking a plurality of unit cells. In addition, the fuel cell (hereinafter referred to as a fuel cell stack) generates electrical energy by providing the fuel and the oxidizing agent to the unit cells.

In the conventional fuel cell stack, the unit cells generate heat of a predetermined temperature through a reduction reaction of the oxidizing agent. The fuel cell stack generating the heat may be cooled down to a temperature range corresponding to a specific operating temperature range of the stack by circulating cooling air or cooling water into the stack.

However, in the conventional fuel cell stack, there occurs a temperature difference in the overall stack due to a characteristic structure of successively stacking the unit cells, a concentration/pressure difference of the fuel and the oxidizing agent, or a utilization coefficient of the fuel.

In other words, in the conventional fuel cell stack, the unit cells located in the central portion show a high heat-generating temperature, and the unit cells located in the outside of the central portion show a low heat-generating temperature.

A non-uniform temperature distribution of the fuel cell stack as described above causes deterioration in performance of the fuel cell stack such as difficulty in outputting a constant voltage through the unit cells of the stack.

SUMMARY OF CERTAIN INVENTIVE ASPECTS

One aspect of the present invention provides a fuel cell stack for maintaining a substantially uniform temperature distribution of the overall fuel cell stack using a simple structure of the fuel cell stack.

Another aspect of the present invention provides a fuel cell stack including a main body that is constructed with an assembly of a plurality of generators, and at least one heat pipe that is disposed in the main body to provide heat to the generators corresponding to heat-generating temperature differences according to positions of the generators.

In addition, the heat-generating temperature of the main body may increase from an outside of the main body toward a center of the main body.

The heat pipes may be disposed in at least one side of the main body, may be arranged in a direction in which the generators are arranged, may be accommodated in at least one accommodating groove formed in the side of the main body, and may be circular-shaped pipes, elliptical-shaped pipes, or polygonal-shaped pipes.

The fuel cell stack may further include heat-conducting insulating layers formed between the main body and the accommodating members.

The fuel cell stack may further include accommodating members that have accommodating grooves with the heat pipes accommodated therein and fixed in the side of the main body. Specifically, the accommodating members may be made of a heat-conducting metal.

The fuel cell stack may further include heat-conducting insulating layers formed between the main body and the accommodating members.

The main body may have pressurizing plates that are arranged close to the generators placed in the outermost side to pressurize the generators, and the accommodating members may be fixed in the pressurizing plates.

The fuel cell stack may further include coupling members for coupling the pressurizing plates to the accommodating members.

The accommodating members may be U-shaped members that surround sides of the main body.

The main body may have cooling paths that are disposed between the adjacent generators to circulate a coolant.

The cooling paths may be constructed to form inlets in one side of the main body and outlets in the other side of the main body, and the heat pipes may be disposed in the remaining side of the main body except the sides in which the inlets and the outlets are formed.

Each of the generators may have a membrane-electrode assembly and separators with the membrane-electrode assembly interposed therebetween, and the cooling paths may be formed in the separators. Specifically, the cooling paths may be formed by assembling the adjacent separators of which facing sides are provided with channels.

The cooling paths may be formed to penetrate a cooling plate interposed between the generators.

BRIEF DESCRIPTION OF THE DRAWINGS

Embodiments of the present invention will be described with reference to the attached drawings.

DETAILED DESCRIPTION OF CERTAIN INVENTIVE EMBODIMENTS

Hereinafter, exemplary embodiments of the present invention will be described in detail with reference to the attached drawings. However, the present invention is not limited to the exemplary embodiments, but may be embodied in various forms.

Figure 1:
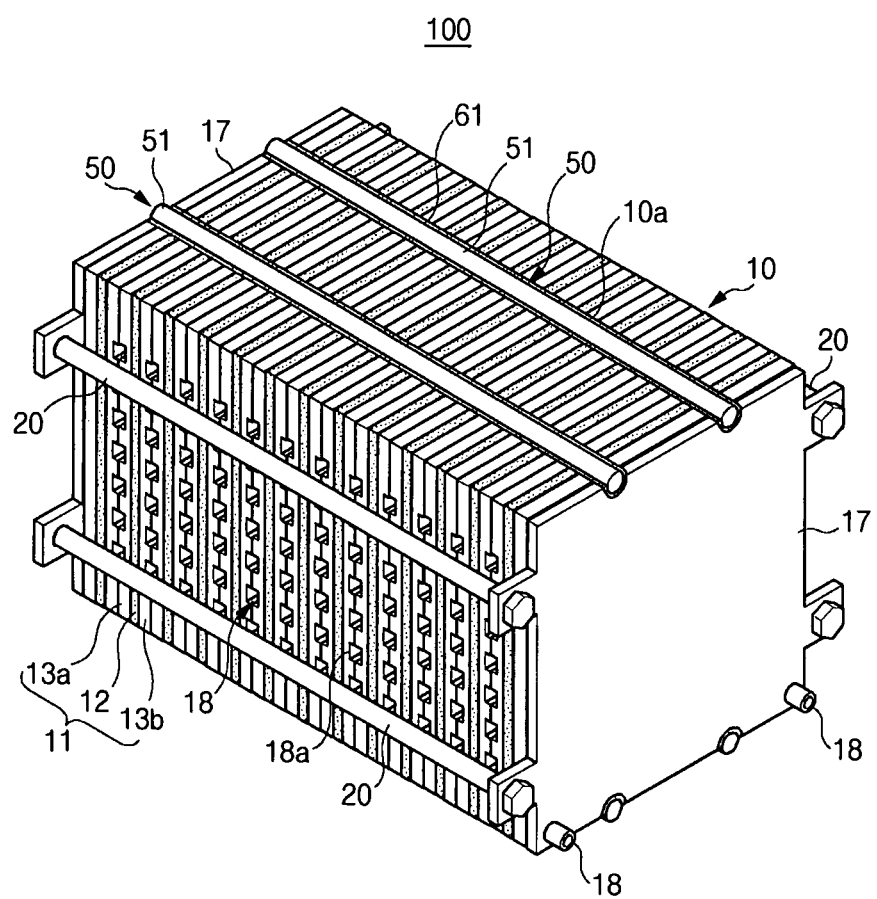
FIG. 1 is a perspective view showing a structure of a fuel cell stack according to a first embodiment of the present invention.
Figure 2:
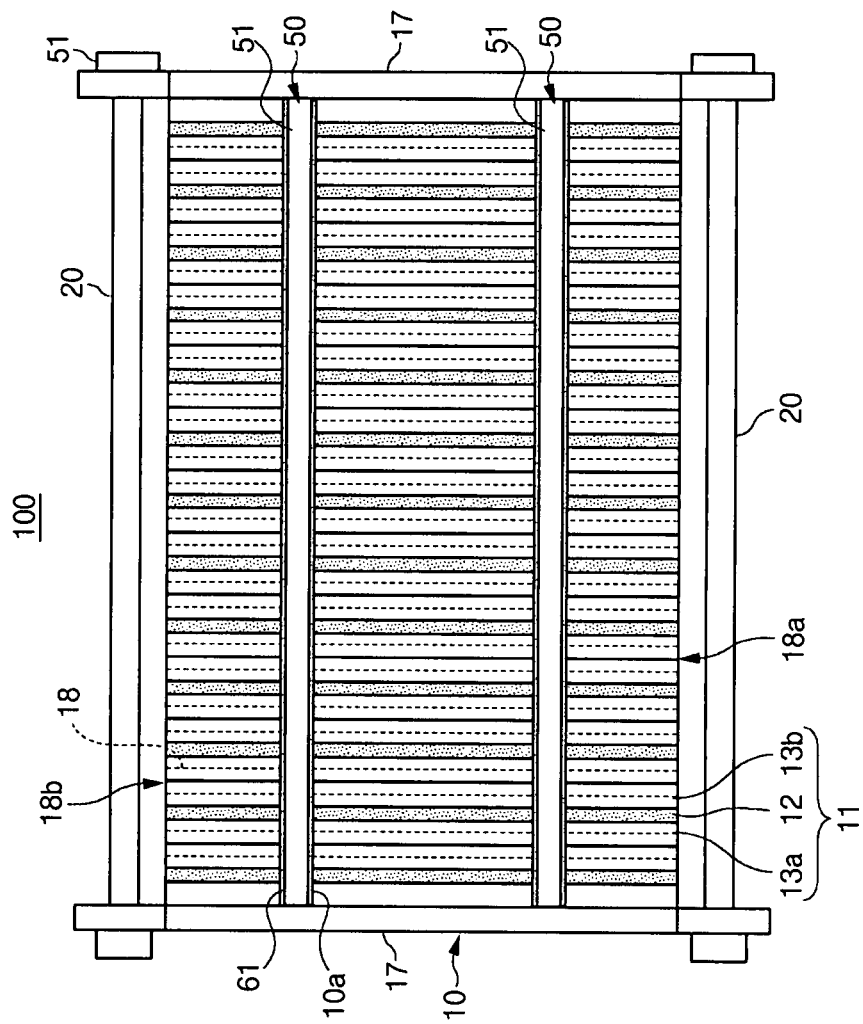
FIG. 2 is a plan view showing the structure shown in FIG. 1.

FIG. 1 is a perspective view showing a structure of a fuel cell stack according to a first embodiment of the present invention, and FIG. 2 is a plan view showing the structure shown in FIG. 1.

The fuel cell stack 100 generates electric energy through a reaction of a fuel and an oxidizing agent.

The fuel may be an alcoholic liquid fuel such as methanol and ethanol. The fuel may include a reforming gas obtained by reforming the liquid fuel or a gas fuel such as methane, ethane, propane, and butane. The oxidizing agent may be oxygen gas stored in a separate tank or natural air.

The fuel cell stack 100 may include a main body 10 having a plurality of generators 11.

The main body 10 is an assembly of the successively-stacked generators 11. An outermost side of the main body 10 is provided with pressurizing plates 17 for attaching generators 11.

The pressurizing plates 17 have a plurality of ports 18 that provide the fuel and the oxidizing agent to the generators 11, and exhaust remaining fuel and oxidizing agent after the reaction in the generators 11 and a product produced in the generators 11.

Each of the generators 11 has a so-called unit cell for generating electric energy through an electrochemical reaction.

Figure 3:
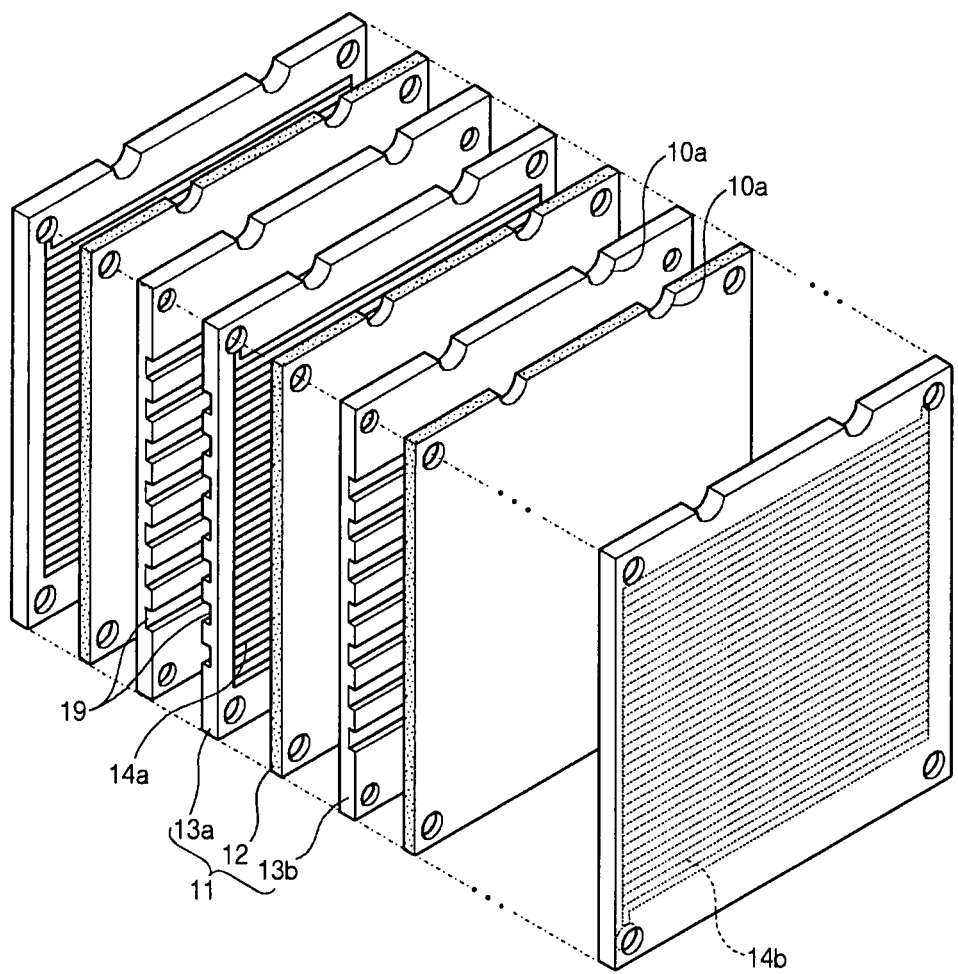
FIG. 3 is an exploded perspective view showing generators shown in FIG. 1.

In one embodiment, as shown in FIG. 3, the generators 11 have a membrane-electrode assembly (MEA) 12 and separators 13a and 13b with the MEA 12 interposed therebetween.

The MEA 12 has a structure in which an anode electrode is formed at one side thereof, a cathode electrode is formed at the other side thereof, and an electrolytic membrane is formed between the anode and cathode electrodes.

The anode electrode oxidizes the fuel to separate electrons and hydrogen ions from the fuel. The electrolytic membrane moves the hydrogen ions to the cathode electrode, and the cathode electrode generates moisture and heat through a reduction reaction of the electrons and the hydrogen ions from the anode electrode and a separate oxidizing agent.

The separators 13a and 13b are conductive members of a rectangular plate shape. Sides of the separators 13a and 13b attached to the MEA 12 include channel-shaped paths 14a and 14b for flowing the fuel and the oxidizing agent, respectively.

In FIG. 1, reference numeral 20, which is not described above, denotes a bolt-shaped coupling rod for coupling a pair of the pressurizing plates.

In one embodiment, the main body 10 has cooling paths 18 for cooling down the generators 11 that generate the heat. The cooling paths 18 are formed between the adjacent generators 11 to circulate a coolant through the generators 11.

In one embodiment, as shown in FIG. 3, in the adjacent generators 11, the cooling paths 18 include the channels 19 formed on sides of the separators 13a and 13b attached to each other, respectively.

The channels 19 may be formed on sides opposite to the sides of the separators 13a and 13b attached to the MEA 12 in the generator 11 and on sides of the other separators 13a and 13b of the adjacent generator 11 facing the separators 13a and 13b of the generator 11.

In other words, the cooling paths 18 (see FIG. 1) may be formed by attaching the adjacent generators 11 opposed to each other and assembling the channels 19 formed on the sides of the separators 13a and 13b.

In this case, the channels 19 are line-shaped channels that extend from one side end of the separators 13a and 13b to the other side end of the separators 13a and 13b. Therefore, the cooling paths 18 form inlets 18a in one side of the main body 10 and outlets 18b in the opposite side of the main body 10 (see FIG. 2).

During the driving of the fuel cell stack 100, heat is generated by the generators 11 of the main body 10. The generators 11 generating the heat are cooled down by the coolant provided to the cooling paths 18. Therefore, the fuel cell stack 100 can maintain a heat-generating temperature corresponding to a specific operation condition.

Meanwhile, the heat-generating temperature of the generators 11 placed in a center of the main body 10 is higher than that of the generators 11 placed in an outside of the main body 10.

this is because the generators 11 are successively attached to each other, so that the heat-generating amount of the generators 11 placed in the center of the main body 10 is higher than that of the generators 11 placed in the outside of the main body 10.

In one embodiment, as shown in FIGS. 1 and 2, the fuel cell stack 100 includes a heat-dispersion unit 50 disposed in the main body 10.

The heat-dispersion unit 50 provides heat to the generators 11 corresponding to the heat-generating temperature difference according to positions of the generators 11. In other words, the heat-dispersion unit 50 maintains a substantially uniform temperature distribution of the overall main body 10 by moving some of the heat generated by the generators 11 corresponding to the center of the main body 10 to the generators 11 corresponding to the outside of the main body 10.

In one embodiment, the heat-dispersion unit 50 has at least one heat pipe 51 disposed in a side of the main body 10. Specifically, heat pipes 51 are disposed at sides adjacent to the sides at which the inlets 18a and the outlets 18b of the cooling paths 18 are formed in the main body 10, and are arranged along a direction in which the generators 11 are arranged.

In one embodiment, the heat pipes 51 are made of a circular-shaped heat-conducting metal, and they are accommodated in accommodating grooves 10a that are arranged along the direction in which the generators 11 are arranged in both sides of the main body 10.

In one embodiment, the accommodating grooves 10a are semicircular-shaped so that they can be combined with the heat pipes 51. In this case, (thermally conductive and electrically) insulating layers 61 are formed between surfaces of the heat pipes 51 and the accommodating grooves 10a. In one embodiment, the insulating layers 61 are made of heat-conducting silicon and are formed by coating the surfaces of the accommodating grooves 10a.

The insulating layers 61 transfer heat generated by the generators 11 to the heat pipes 51, attach the heat pipes 51 to the surfaces of the accommodating grooves 10a, and prevent the metallic heat pipes 51 from shorting the generators 11.

Alternatively, the heat pipes 51 are not limited to heat-conducting metals, but may be made of insulators such as ceramics. In this case, the insulating layers 61 as described above are not needed.

The heat pipes 51 are heat transfer devices that transfer heat from a place having a high heat-generating density to a place having a low heat-generating density using latent heat necessary for a phase change process of a fluid. Moreover, the heat pipes 51 may have a pipe-shaped sealing case, a wick formed in the sealing case, and working fluids filled in the sealing case.

The heat pipes 51 transfer heat from a high-temperature area to a low-temperature area using a process that evaporates the working fluids in the high-temperature area to generate vapors, transfers the vapors to the low-temperature area, condenses the vapors to emit latent heat, and returns the condensed working fluids to the high-temperature area. The heat pipes 51 can be made of typical heat pipes where working fluid is contained and circulated according to a temperature gradient.

As described above, the fuel cell stack 100 includes the heat pipes 51 disposed in both sides of the main body 10, so that it is possible to transfer some heat that is generated by the generators 11 placed at the center of the main body 10 corresponding to the high-temperature area to the generators 11 placed at the outside of the main body 10 corresponding to the low-temperature area in operation of the fuel cell stack 100.

In other words, the heat pipes 51 transfer heat corresponding to a heat-generating temperature difference between the high-temperature area and the low-temperature area in the overall main body 10 from the generators 11 corresponding to the center of the main body 10 to the generators 11 corresponding to the outside of the main body 10.

As described above, the fuel cell stack 100 can radiate heat that is generated by the generators 11 placed at the center of the main body 10 and provide the heat to the generators 11 placed at the outside of the main body 10, so that it is possible to maintain a substantially uniform temperature distribution of the overall main body 10.

Figure 4:
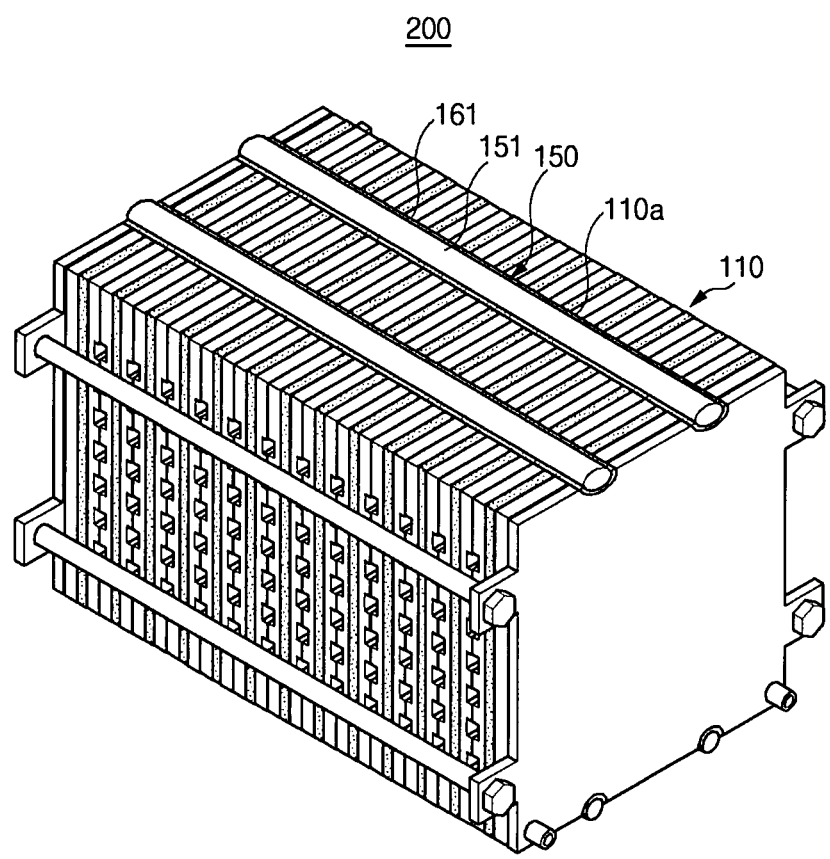
FIG. 4 is a perspective view showing a structure of a fuel cell stack according to a second embodiment of the present invention.

FIG. 4 is a perspective view showing a structure of a fuel cell stack according to a second exemplary embodiment of the present invention.

The fuel cell stack 200 of FIG. 4 has substantially the same basic structure as that of the first embodiment except that a heat-dispersion unit 150 includes elliptical-shaped heat pipes 151.

Since the heat pipes 151 are elliptical-shaped, it can provide the greater contacting area between the heat pipes 151 and both sides of a main body 110 compared to the first embodiment. Therefore, it is possible to further improve a heat-transfer capacity of the heat pipes 151.

Since the heat pipes 151 are elliptical-shaped, semi-elliptical-shaped accommodating grooves 110a are formed for coupling the heat pipe 151 in both sides of the main body 110. In addition, heat-conducting insulating layers 161 similar to those of the first embodiment are formed between surfaces of the heat pipes 151 and the accommodating grooves 110a.

Since the other structures and operations of the fuel cell stack 200 of FIG. 4 are similar to those of the first embodiment, a detailed description of the fuel cell stack 200 is omitted.

Figure 5:
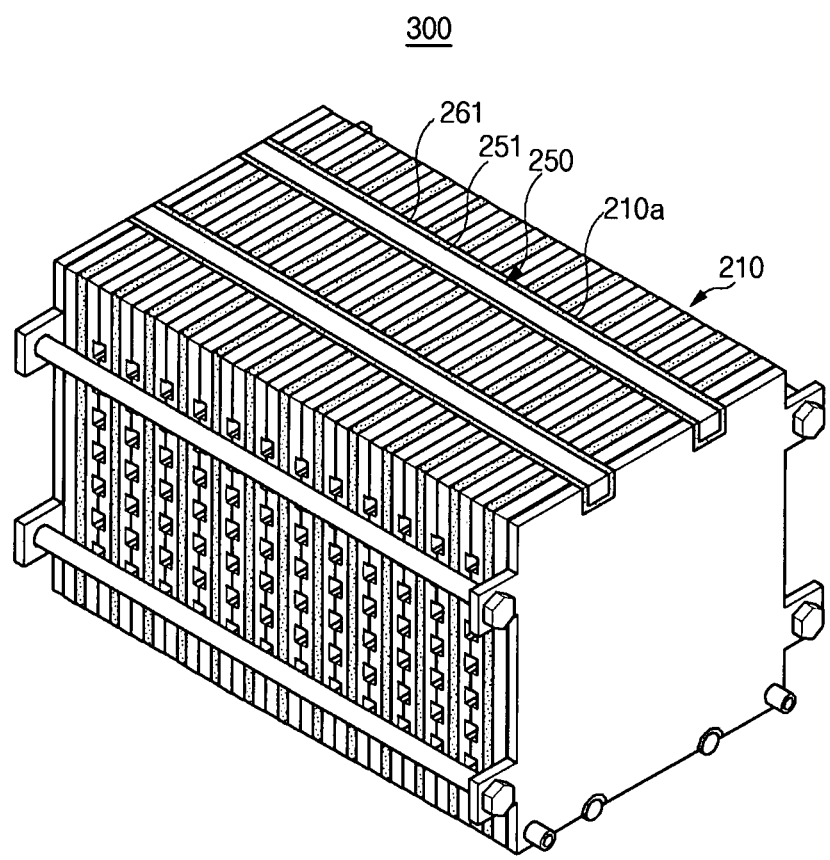
FIG. 5 is a perspective view showing a structure of a fuel cell stack according to a third embodiment of the present invention.

FIG. 5 is a perspective view showing a structure of a fuel cell stack according to a third exemplary embodiment of the present invention.

The fuel cell stack 300 of FIG. 5 has substantially the same basic structure as that of the first embodiment except that a heat-dispersion unit 250 includes polygonal-shaped or rectangular-shaped heat pipes 151.

Similar to the second embodiment, since the heat pipes 251 are polygonal-shaped, it can increase the contacting area between the heat pipes 251 and both sides of a main body 210 compared to the first embodiment. Therefore, it is possible to further improve a heat-transfer capacity of the heat pipes 251.

In this case, since the heat pipes 251 are rectangular-shaped, rectangular-shaped accommodating grooves 210a are formed for coupling the heat pipe 251 in both sides of the main body 210. In addition, heat-conducting insulating layers 261 similar to those of the first embodiment are formed between surfaces of the heat pipes 251 and the accommodating grooves 210a.

Since the other structures and operations of the fuel cell stack 300 according to the third embodiment are similar to those of the first embodiment, a detailed description of the fuel cell stack 300 is omitted.

Figure 6:
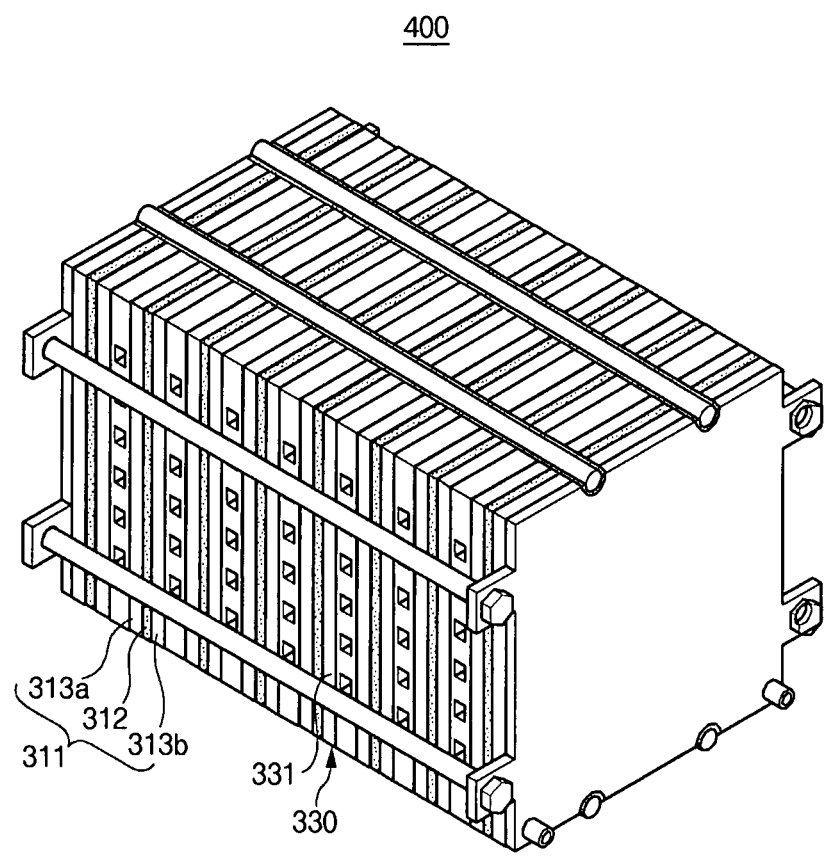
FIG. 6 is a perspective view showing a structure of a fuel cell stack according to a fourth embodiment of the present invention.

FIG. 6 is a perspective view showing a structure of a fuel cell stack according to a fourth exemplary embodiment of the present invention.

The fuel cell stack 400 of FIG. 6 has substantially the same basic structure as that of the first embodiment except that the fuel cell stack 400 further includes a cooling plate 330 disposed between adjacent generators 311.

In one embodiment, the cooling plate 330 is placed between surfaces with the separators 313a and 313b attached to each other with regard to the generators 311, in other words, between opposite surfaces attached to both sides of an MEA 312.

For example, the cooling plate 330 has cooling paths 331 for circulating a coolant. The cooling plate 330 functions as a heat-radiating plate for radiating heat transferred to the separators 313a and 313b of the generators 311 in operation of the generating part 311.

The cooling plate 330 may be made of a heat-conducting material such as aluminum, copper, and steel. In addition, in order to smoothly circulate the coolant, the cooling paths 331 may be formed to penetrate the cooling plate 330 from one end thereof to the other end thereof.

Since the other structures and operations of the fuel cell stack 400 according to the fourth embodiment are similar to those of the first embodiment, a detailed description of the fuel cell stack 400 is omitted.

Figure 7:
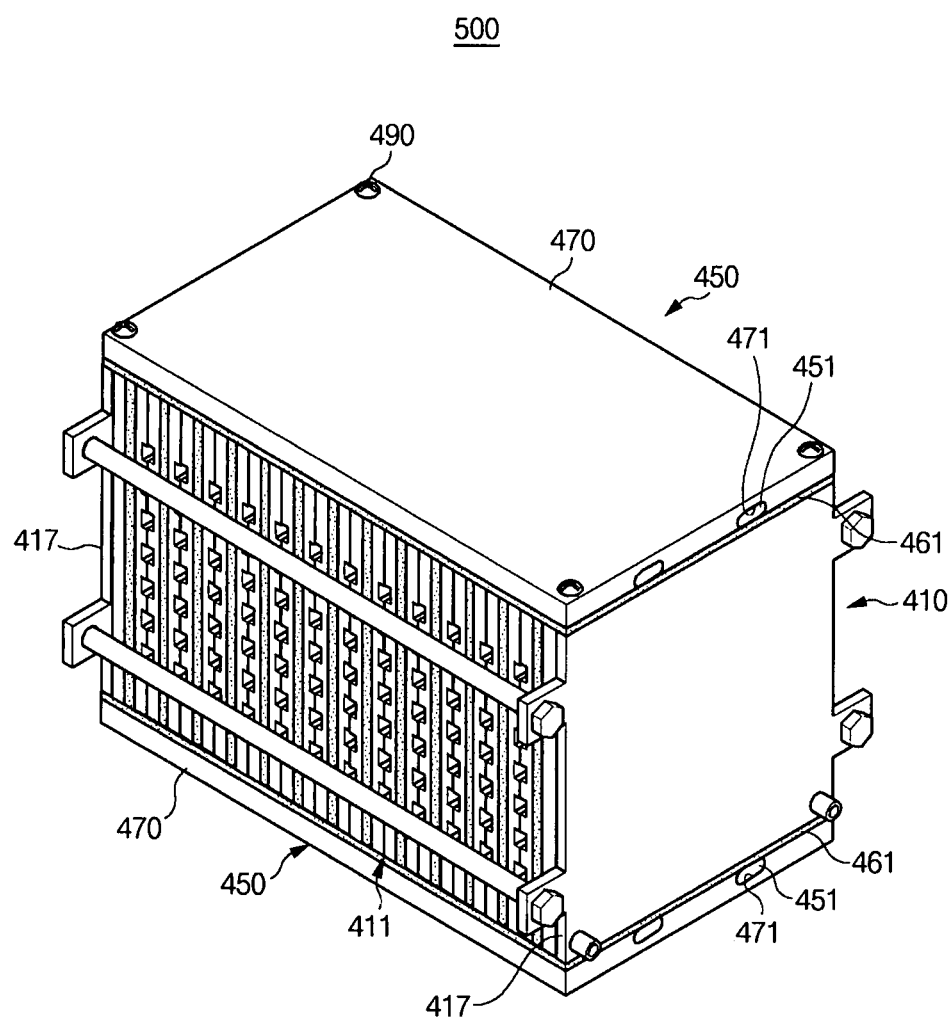
FIG. 7 is a perspective view showing a structure of a fuel cell stack according to a fifth embodiment of the present invention.

FIG. 7 is a perspective view showing a structure of a fuel cell stack according to a fifth exemplary embodiment of the present invention.

The fuel cell stack 500 of FIG. 7 has substantially the same basic structure as that of the first embodiment except that a heat-dispersion unit 450 includes accommodating members (or blocks) 470 that have accommodating grooves 471 for accommodating heat pipes 451 and are fixed in both sides of a main body 410.

In one embodiment, the accommodating members 470 are rectangular plate-shaped members made of a heat-conducting metal such as aluminum. The accommodating members 470 have the accommodating grooves 471 in surfaces opposed to both sides of the main body 410.

The accommodating grooves 471 are arranged along a direction in which generators 411 of the main body 410 are arranged. In addition, the accommodating grooves 471 are formed with such a structure that the heat pipes 451 can be accommodated therein.

In one embodiment, the heat pipes 451 are elliptical-shaped similar to the second embodiment. In addition, the heat pipes 451 can be inserted and accommodated in the accommodating grooves 471 of the accommodating members 470.

The accommodating members 470 are opposed to each other and are arranged at both sides of the main body 410, and are fixed in pressurizing plates 417 of the main body 410 using coupling members 490 such as bolts.

Since the heat pipes 451 and the accommodating members 470 are made of a heat-conducting metal, heat-conducting insulating layers 461 are formed between the main body 410 and the heat pipes 451 and between the main body 410 and the accommodating members 470.

The insulating layers 461 have functions of transferring the heat generated by the generators 411 to the heat pipes 451 and the accommodating members 470, attaching the heat pipes 451 and the accommodating members 470 to both sides of the main body 410, and preventing the metallic heat pipes 451 and the accommodating members 470 from shorting the generators 411.

In one embodiment, the fuel cell stack 500 includes the accommodating members 470 that are fixed in both sides of the main body 410 so as to accommodate the heat pipes 451, and the accommodating members 470 are heat-conducting members. Therefore, it is possible to further improve a heat transfer capacity of the heat pipes 451. In another embodiment, at least one channel may be formed in one or both of the accommodating members 470. In this embodiment, a working fluid may be provided in the channel. Furthermore, the at least one channel may function as the heat pipe.

Since the other structures and operations of the fuel cell stack 500 according to the fifth embodiment are similar to those of the first embodiment, a detailed description of the fuel cell stack 500 is omitted.

Figure 8:
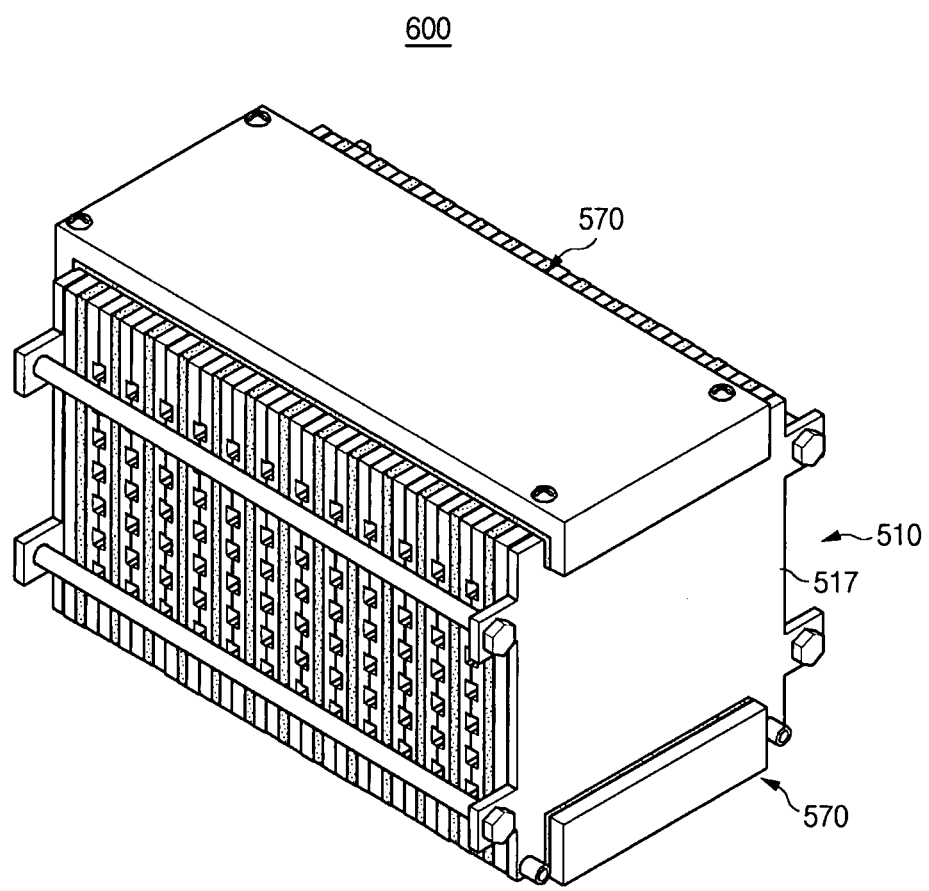
FIG. 8 is a perspective view showing a structure of a fuel cell stack according to a sixth embodiment of the present invention.

FIG. 8 is a perspective view showing a structure of a fuel cell stack according to a sixth exemplary embodiment of the present invention.

The fuel cell stack 600 of FIG. 8 has substantially the same basic structure as that of the fifth embodiment except that the accommodating members 570 of the fuel cell stack 600 surround at least part of both sides of a main body 510.

In one embodiment, the accommodating members 570 are fixedly arranged at both sides of the main body 510. In addition, the accommodating members 570 may be U-shaped members formed by bending both ends of the accommodating members 570 along a plane direction of pressurizing plates 517. In the accommodating members 570, heat pipes (not shown in FIG. 8) corresponding to a specific shape of the accommodating members 570 are disposed 1.

Since the other structures and operations of the fuel cell stack 600 according to the fourth embodiment are similar to those of the fifth embodiment, a detailed description of the fuel cell stack 600 is omitted.

According to at least one embodiment, since the heat-dispersion unit is disposed in the main body in which the heat-generating temperature of the center is higher than that of the outside, it is possible to maintain a substantially uniform temperature distribution of the overall main body.

Therefore, according to at least one embodiment of the present invention, it is possible to improve performance efficiency of the overall fuel cell stack by outputting a substantially constant electric energy corresponding to a predetermined voltage from the generators of the main body.

Although the exemplary embodiments and the modified examples of the present invention have been described, the present invention is not limited to the embodiments and examples, but may be modified in various forms without departing from the scope of the appended claims, the detailed description, and the accompanying drawings of the present invention. Therefore, it is natural that such modifications belong to the scope of the present invention.

What is claimed is:

1. A fuel cell device comprising:
a plurality of unit fuel cells stacked together to form a stacked body, wherein the stacked body is configured to generate heat as the plurality of unit cells generate electricity, and wherein the stacked body has first and second surfaces opposing each other; and
at least one heat pipe being in thermal communication with the stacked body, wherein the at least one heat pipe is configured to transfer heat from a first location to a second location of the stacked body, wherein the at least one pipe has a length which is substantially the same as the distance between the first and second surfaces of the stacked body, wherein the pipe comprises first and second side portions each having the same length as the length of the stacked body, wherein the entire first side portion of the pipe is buried into the stacked body, and wherein the entire second side portion of the pipe is not covered by the stacked body.

2. The fuel cell device of claim 1, wherein the first location is closer to the center of the stacked body than the second location.

3. The fuel cell device of claim 1, wherein the at least one heat pipe comprises two heat pipes which are in thermal communication with the first surface, and wherein the two heat pipes are substantially parallel to each other.

4. The fuel cell device of claim 1, further comprising a working fluid configured to circulate within the at least one heat pipe.

5. The fuel cell device of claim 1, wherein at least one groove is formed into the first surface, and wherein the at least one heat pipe is received by the at least one groove.

6. The fuel cell device of claim 1, wherein the at least one heat pipe has a cross-section taken in a plane perpendicular to a longitudinal direction of the heat pipe, and wherein the cross-section is in a general shape selected from the group consisting of a circle, an oval and a polygon.

7. The fuel cell device of claim 1, wherein the at least one heat pipe comprises at least one channel formed through a block in thermal communication with the stacked body.

8. The fuel cell device of claim 1, wherein the fuel cell device further comprises a first block and a second block, wherein the first block is in thermal communication with the first surface, wherein the second block is in thermal communication with the second surface, and wherein the at least one heat pipe comprises at least one channel formed through the first block and at least one channel formed through the second block.

9. The fuel cell device of claim 1, wherein the at least one heat pipe is in thermal communication with the first surface, wherein the fuel cell device further comprises a layer formed between the first surface and the at least one heat pipe, and wherein the layer is thermally conductive and electrically insulating.

10. The fuel cell device of claim 1, wherein the fuel cell stack further comprises a block which is in thermal communication with the first surface, wherein at least one groove is formed into the block, and wherein the at least one heat pipe is received by the at least one groove.

11. The fuel cell device of claim 10, wherein the block is made of a heat-conducting metal.

12. The fuel cell device of claim 10, further comprising a layer formed between the first surface and the block, wherein the layer is thermally conductive and electrically insulating.

13. The fuel cell device of claim 10, wherein the stacked body comprises two end plates opposing each other, and wherein the block is coupled to the two end plates.

14. The fuel cell device of claim 13, further comprising a plurality of coupling-members configured to couple the end plates to the block.

15. The fuel cell device of claim 10, wherein the stacked body comprises two end plates opposing each other, wherein both ends of the block extend toward the end plates so as to cover at least part of the end plates.

16. The fuel cell device of claim 1, wherein the stacked body comprises a plurality of cooling paths configured to circulate a coolant.

17. The fuel cell device of claim 16,
wherein the cooling paths comprise a plurality of inlets and a plurality of outlets formed in two opposing surfaces of the stacked body.

18. The fuel cell device of claim 16,
wherein each of the plurality of unit cells comprises a generator which includes a membrane-electrode assembly and separators with the membrane-electrode assembly interposed therebetween, and
wherein the cooling paths are formed in the separators.

19. The fuel cell stack of claim 18, wherein the cooling paths are formed to penetrate a cooling plate interposed between the generators.

20. A method of operating a fuel cell device, the method comprising:
providing the fuel cell device of claim 1, wherein a fluid is provided inside the at least one heat pipe; and
circulating the fluid through the at least one heat pipe so as to transfer heat from the first location to the second location of the stacked body.

* * * * *